United States Patent Office 3,154,495
Patented Oct. 27, 1964

3,154,495
CALCIUM HYPOCHLORITE ARTICLE
AND PROCESS
Homer L. Robson, Lewiston, N.Y., and William H. Sheltmire, Baltimore, Md., assignors to Olin Mathieson Chemical Corporation, a corporation of Virginia
No Drawing. Filed Aug. 10, 1961, Ser. No. 130,487
2 Claims. (Cl. 252—99)

This invention relates to an article of manufacture and the process of making it. More particularly the invention relates to an envelope of laid fabric resistant to the action of concentrated aqueous solutions of hypochlorites and containing a solid calcium hypochlorite composition.

In one embodiment of the invention the calcium hypochlorite contained in the envelope is a high test calcium hypochlorite containing at least 70 percent of available chlorine which is in the form of powder, granules or tablets. Such a high test calcium hypochlorite is commercially available under the designation, HTH. The calcium hypochlorite composition may also comprise calcium hypochlorite diluted with inert diluent salts, for example, sodium chloride. The article in this form is designed for use when it is desired to dispense a calcium hypochlorite solution at a rate controlled by the porosity of the envelope by immersion in an aqueous medium to which the calcium hypochlorite is to be supplied. In another aspect the article of the present invention contains, within the envelope of hypochlorite-resistant, laid fibers, a composition comprising calcium hypochlorite and a water-soluble salt reactive with calcium hypochlorite to form a water-soluble hypochlorite and a precipitate of a water insoluble calcium salt. The article in this form is designed for use by immersion in an aqueous medium to supply controlled amounts of water-soluble hypochlorite with a minimum of calcium ions or precipitated calcium salts. On immersion in water the composition contained in the envelope reacts to form an insoluble calcium precipitate which is contained within the envelope and an aqueous solution of a water-soluble hypochlorite which is leached from the envelope into the body of aqueous medium to which the available chlorine is to be supplied. The invention also takes other forms described below.

Laid fabrics of non-woven fibers are commercially available which are prepared from various fibers in several porosity grades. Many of these are composed of thermoplastic fibers which are chemically resistant to the reaction of concentrated aqueous solutions of hypochlorites and are thus suitable for use according to the present invention. Among the thermoplastic fibers particularly useful are nylons, polyethylene, polypropylene, polyethylene terephthalate (sold under the name of "Dacron"), acrylonitrile fibers or acrylonitrile co-polymer fibers (sold under the names of "Dynel" and "Orlon"), polyvinyl chloride-acetate, polymethyl methacrylate, and polyvinylidene chloride. All of these are resistant to the action of concentrated aqueous solutions of hypochlorite and are preferred for ease of manufacture, availability and low cost.

Glass fibers are also thermoplastic at higher temperatures and are laid to form fabrics suitable for use according to the present invention. Blends of various fibers laid together are particularly advantageous. For example, a blend of 80 percent by weight of glass fibers, preferably about ⅛ to ¼ inch in length, with 20 percent of Dynel fibers up to ⅜ inch in length and bonded by mild heat treatment is an excellent envelope material. For use in the present invention, these fabrics are preferably bonded by application of heat and/or pressure to the thermoplastic fibers themselves. Where bonding agents are used, they must also be hypochlorite resistant. Suitable materials include sodium silicate, polyvinyl chloride, polyvinyl acetate-chloride, polymethyl methacrylate and polyvinylidene chloride. These binders may be applied by spraying the melted, dissolved or suspended material onto the fibers.

Non-thermoplastic fibers resistant to hypochlorites are also converted to non-woven fabrics by the application of minor proportions of thermoplastic bonding agents. Asbestos fibers, for example, are sprayed lightly with melted polyethylene, and sealed by the subsequent application of heat. While the non-thermoplastic fibers are suitable for use in making laid fabrics appropriate for the present invention, it is preferred to employ blends with thermoplastic fibers. At least 40 percent or more of thermoplastic fibers with the non-thermoplastic fibers is necessary to form a satisfactory fabric.

The laid fabrics are manufactured in a variety of weights, thicknesses and porosities. The weights may vary from one ounce or less per square yard up to 8 or more ounces. The thickness also varies from a few mils up to 3 inches. For the purposes of the present invention, thicknesses of the paper or fabric quality are useful but the weight and thickness are less important characteristics than the porosity. The ability to retain precipitates and to control the rate of dissolution of the contents of the envelope are measured by porosity. For this purpose the Gurley Hill test described in TAPPI (Technical Association of the Pulp and Paper Industry) Method T460m–49 is useful. This test measures the number of seconds required for 100 milliliters of air to flow through one square inch of the paper or fabric under particular conditions of test. The numerical results vary inversely with the porosity, the more porous materials having lower values by this test. For the purposes of this invention, porosities, according to Gurley Hill, are suitably from about 0.01 to about 25 or more depending on the use desired. When the purpose as subsequently described in detail is to retain a precipitated calcium salt, porosities of about 0.05 to 10 are used, preferably about 0.1 to 0.5 Where the purpose is to dissolve and dispense calcium hypochlorite compositions and no precipitate is involved, broader ranges of porosity are used from about 0.01 to 25. When rapid dissolution is desired the more porous fabrics are preferred and when the composition is to be dispensed slowly over a longer period of time, the less porous fabrics are preferred.

In the process of preparing the articles of the present invention, an envelope is prepared from a sheet or sheets of the laid fabric, filled with a calcium hypochlorite composition and sealed. The envelope may be prepared by sealing all but one of the edges of a matching pair of sheets, filling and then sealing the last edge. For example, triangular sheets are sealed along two edges, filled and then the third edge is sealed. Alternatively, a sheet of the laid fabric of any suitable size, for example, 6 x 12 inches, is folded once and sealed along two of the open edges. Sealing is accomplished by cementing with a hypochlorite-resistant material, for example, a cellulose nitrate-solvent mixture, such as "Duco" cement. Preferably, especially in commercial manufacture, the edges of the envelopes are heat-sealed by known means. Thermoplastic fibers are conveniently heat-sealed by direct application of heat preferably under pressure. Other fibers such as asbestos are sealed by the application of a thermoplastic, for example, by spraying or solvent application and heat-sealed. The envelope is filled with a calcium hypochlorite composition and the last edge is sealed to close the envelope. For convenience in use an eyelet may be stapled in the sealed area along one edge of the envelope. One or more of the filled envelopes is geously, by means of a thread of fiber also resistant to the action of concentrated aqueous hypochlorites. The suspending thread may be the same or different from the fiber or fibers constituting the envelope. In a washing machine, it is convenient to supply an envelope containing a suitable amount of bleaching composition for an average load. The size of the envelope and weight of contents may be varied to provide envelopes for light duty or heavy duty depending on the magnitude of the bleach demand. In a particular embodiment of the invention adapted to home laundry use, it is advantageous to provide a tube of the laid thermoplastic fiber, closed by sealing at intervals along the length of the tube with alternate envelopes being filled with a calcium hypochlorite composition and a detergent. The continuous tube may be used by cutting any two adjacent envelopes from the strip and suspending them in the aqueous medium in the washing machine. Alternatively the envelopes may be provided separately or in pairs for this purpose. When used in a washing machine for bleaching processes, the envelope containing the calcium hypochlorite composition allows the resulting hypochlorite solution to be dispensed slowly and evenly throughout the load thereby eliminating danger of over-bleaching or pin-holing that may be caused when liquid or dry hypochlorites are added directly to the machine. Particles of the calcium hypochlorite composition contained in the envelope cannot directly contact and remain for a period of time in contact with the goods being washed. Thus pinholes cannot be formed using the articles of the present invention in laundries. Alternate envelopes filled with a calcium hypochlorite composition and detergent provides a dry bleach detergent combination for washing machines without the hazards associated with intimate mixtures of these components.

In the treatment of public or private swimming pools, it is advantageous to provide a plurality of envelopes, containing a calcium hypochlorite composition, at spaced intervals around the pool for proper distribution of the available chlorine in the body of water in the pool. Where circulation of the aqueous medium in the pool is maintained at a high level, however, a smaller number or even a single envelope of larger size will provide adequate treatment.

The calcium hypochlorite composition enclosed in the envelope may be varied for different purposes. Where the purpose is to provide a solution of calcium hypochlorite, that material alone or mixed with an inert diluent such as sodium chloride is suitably used. For example, the product of Robson, U.S. Patent 2,963,440 is appropriate. Where the purpose is to provide a clear solution of a water-soluble hypochlorite to a larger body of aqueous medium, the calcium hypochlorite is mixed with a water-soluble salt reactive with calcium hypochlorite to form a water-soluble hypochlorite and an insoluble calcium salt. Ordinarily this water-soluble salt is an alkali metal salt which may advantageously be a commercially available potassium or sodium salt. Most satisfactory results have been obtained where the soluble salt is sodium carbonate. The resulting calcium carbonate precipitates in a readily filterable form which is retained effectively by the envelope allowing the sodium hypochlorite solution to be leached readily therefrom. Other salts which give satisfactory results include sodium silicate, potassium silicate, trisodium phosphate, disodium phosphate, sodium borate and sodium sulfate. Particularly advantageous results have been obtained using approximately stoichiometric amounts of the water-soluble salts to react with the calcium in the calcium hypochlorite introduced. The composition of Robson U.S. Patent 2,829,110 is suitable for this purpose. When the introduction of some calcium ion is not objectionable, less than stoichiometric amounts are suitable. Larger proportions than stoichiometric of the water-soluble salt are useful when the excess of the latter is advantageous, for example in adding alkalinity or water softening.

When used in swimming pools for algaecidal and bactericidal puropses, the envelope containing a calcium hypochlorite composition allows the resulting hypochlorite solution to be dispensed more slowly than when either liquid or dry hypochlorite products are added directly to the pool water. Slowing down the dispensation of a hypochlorite solution into the pool water not only greatly prolongs the desired algaecidal and bactericidal effects but also imparts an economy that would not otherwise be obtained because less product is required to attain and maintain acceptable pool water sanitation.

Where the purpose is to provide a hypochlorite in solution and where the calcium is not objectionable provided it is properly sequestered, the calcium hypochlorite composition advantageously comprises calcium hypochlorite mixed with tetrasodium pyrophosphate, sodium tripolyphosphate, sodium tetraphosphate or any of the hexametaphosphates in any desired proportion. A particularly advantageous composition for this puropse is that described in Robson U.S. Patent 2,959,554.

The hypochlorite containing envelopes of the present invention have the further advantages over other forms of bleaching and sanitizing compositions that:

(1) No measuring is required,
(2) No messy liquids need be handled,
(3) No glass can be broken,
(4) No direct contact of hands with the product and
(5) Chances of accidental swallowing of dry or liquid bleach compositions are greatly reduced.

*Example 1*

Several envelopes were made up from a laid Dacron (polyethylene terephthalate) fabric weighing 1½ ounces per square yard and having a porosity of 3.0. Sheets 5 x 10 inches were folded in half and sealed along the two edges by Duco cement, a cellulose nitrate-solvent composition. Into each of these envelopes was placed 6 ounces of an intimate mixture of 66 percent of granular HTH, a high test hypochlorite composition containing 70 percent available chlorine with 34 percent of anhydrous sodium carbonate. The amount of sodium carbonate is substantially the theoretical amount to convert the calcium in the HTH to calcium carbonate. Six of these envelopes were placed in a Miami, Florida, swimming pool having a capacity of approximately 20,000 gallons and having a surface measuring 16 x 32 feet. The depth of the water varied from 4½ to 6½ feet. The water was circulated at a rate of 40 to 50 gallons per minute by a pump providing better than average agitation. In addition swimming served to agitate the contents of the pool. One envelope was anchored at the mid point of each side of the pool and one on each side of the pool about ¼ the length of the pool from each end. Samples were taken at various times and at various points in the pool but, because of the excellent agitation no substantial differences appeared at different locations in the pool. The available chlorine content of the pool water was about 0.2 part per million at 5:30 p.m. when the envelopes were introduced into the pool. By 9:15 p.m. the available chlorine content in the pool had risen to 0.6 part per million and at 6:30 a.m. the next morning was slightly above 1 part per million. During the afternoon the pool was used for swimming and at 5 p.m. the available chlorine content was reduced to 0.2 part per million. By 6:15 a.m. on the following day the available chlorine content was above 0.35 part per million. The envelopes were removed and replaced by fresh envelopes. During the tests some of the envelopes were afloat and some hung from the anchor thread. Whether the envelopes sink or float appears to depend on temporarily trapped air or other gas, but seems not to affect the functioning or dispensing of hypochlorite solution to the main body of aqueous medium. During the tests, no cloudiness or sludge developed in the pool or appeared in the vicinity of the envelopes. After the envelopes were removed from the pool the contents were sampled and analyzed and found to contain about 90 percent of the calcium originally introduced as calcium hypochlorite.

*Example II*

In a test carried out by the procedure of Example I in the same pool at a different date using envelopes containing an intimate mixture of 53 percent of HTH, 14 percent anhydrous sodium carbonate and 33 percent of tetrasodium pyrophosphate, the envelopes provided an available chlorine content in the body of water in the pool of about 0.7 part per million of available chlorine. During a period of swimming use, the available chlorine content dropped to about 0.2 part per million but rose overnight to slightly more than 1 part per million and on the next day during a swimming period dropped again to 0.2 part per million of available chlorine. Analysis of the contents of the exhausted envelopes showed retention of about 81 percent of the calcium originally supplied in the form of HTH. The calcium not retained was insufficient to cause any cloudiness in the swimming pool water.

Six fresh envelopes were used to replace the ones which were exhausted and removed. Overnight the available chlorine content rose to more than 1 part per million. During a period of swimming the following afternoon, the available chlorine content of the pool water was maintained at about 0.2 part per million.

*Example III*

The procedure of Example I was repeated using folded Dacron envelopes of porosity 3.3 containing an intimate mixture of 61 percent of HTH and 39 percent of tetrasodium pyrophosphate. Introduced into the pool at 11 a.m. when the available chlorine content of the pool water was about 0.2 part per million, the pool was used for swimming during the afternoon. Later at 6 p.m. the pool water contained about 1 part per million of available chlorine and showed the same content of available chlorine at 7:15 a.m. on the next day. The available chlorine content slowly dropped and was about 0.1 part per million at 1:15 p.m. The exhausted envelopes were removed and replaced by fresh envelopes containing the same calcium hypochlorite composition. By 7:30 a.m. on the following day the available chlorine content of the pool water was slightly more than 1 part per million which dropped slowly during the day to about 0.1 part per million. The contents of the exhausted envelopes were analyzed and found to contain 76 percent of the calcium introduced in the form of HTH. At no time was the minor amount of calcium introduced into the pool sufficient to cause any cloudiness.

*Example IV*

A granular grade of high test calcium hypochlorite containing 70 percent available chlorine was intimately mixed with varying amounts of tetrasodium pyrophosphate and sealed in Dacron envelopes having a porosity of 0.2 as described in Example I. Each envelope contained approximately 10 grams of one of the compositions shown in the table below. The weight of the composition was varied to include in each envelope the same weight of calcium. Each envelope was then suspended in 2 liters of intermittently stirred water at room temperature for 24 hours. The available chlorine content of the aqueous medium was determined at intervals and, at the end of 24 hours, the percent of the precipitated solids retained in each envelope was determined. The results are shown in the following table:

| No. | HTH, Percent | Tetrasodium Pyrophosphate, Percent | Av. Cl. Percent | Percent Release of Av. Cl (Hours) | | | | Precipitated Solids Retained, Percent |
|---|---|---|---|---|---|---|---|---|
| | | | | 2 | 5 | 8 | 24 | |
| 1 | 97 | 3 | 73.1 | 50 | 88 | 98 | 100 | 62 |
| 2 | 93 | 7 | 69.3 | 45 | 79 | 92 | 100 | 82 |
| 3 | 90 | 10 | 66.9 | 37 | 68 | 81 | 100 | 88 |
| 4 | 85 | 15 | 62.7 | 23 | 54 | 79 | 100 | 92 |
| 5 | 80 | 20 | 56.7 | 23 | 51 | 78 | 100 | 94 |

These data show control of the available chlorine dosage to the aqueous body by increasing the proportions of tetrasodium pyrophosphate to reduce the rate. The retention of solids was also improved.

*Example V*

Envelopes were prepared using laid Dacron having a porosity of 0.19 as described in Example I. Each envelope contained a different calcium hypochlorite composition prepared by intimately mixing granular HTH with the theoretical amount of the diluent salt to react with the calcium hypochlorite in the HTH. The sealed envelopes were hung in 2 liters of intermittently stirred water at room temperature for 24 hours. At the end of this time the contents of each envelope were examined to determine the percent of the calcium obtained compared with that introduced in the form of calcium hypochlorite. The following results were obtained:

| No. | Diluent | Diluent, percent | HTH, percent | Av. Cl. percent | Calcium Retained, percent |
|---|---|---|---|---|---|
| 1 | Na$_2$CO$_3$ | 34 | 66 | 44.3 | 64.0 |
| 2 | Na$_3$PO$_4$ | 35.8 | 64.2 | 46.2 | 64.0 |
| 3 | Na$_2$HPO$_4$ | 42 | 58 | 41.4 | 87.0 |
| 4 | Na$_2$SiO$_3$ | 38.4 | 61.6 | 43.3 | 62.4 |

The data show that disodium orthophosphate gave a precipitate which retained the calcium particularly well in this envelope material. For the purposes of this test a highly porous Dacron was used to bring out the comparative effectiveness of the salts tested. In the manufacture of articles for commercial use it is preferred to utilize a material having less porosity than that used in the test of this example.

*Example VI*

Envelopes of laid Dacron of various porosity grades were prepared as described in Example I. Each envelope contained 10 grams of HTH tablets and was suspended at room temperature in two liters of stirred water artificially hardened to 300 parts per million of bicarbonate hardness. The time for complete dissolution of the tablets was observed visually. The tablets in the most porous envelope having a porosity of 0.056 was complete in 8 hours, the tablets in the 0.2 porosity envelope dissolved completely in 16 hours, the tablet in the 2.8 porosity envelope required 24 hours and the HTH tablets in the 23 porosity envelope lasted for 48 hours.

*Example VII*

An envelope was made up from a laid Dacron (polyethylene terephthalate) fabric weighing approximately 1½ ounces per square yard having a porosity of 3.0. A sheet approximately 8 inches in length and 4 inches in width was folded in half to form an envelope approximately 4 inches square. Into the envelope was placed approximately one ounce of an intimate mixture of "Ad-Dri" bleach (product of U.S. Patent 2,959,554) containing approximately 8 percent available chlorine. The envelope was then heat-sealed along the two opened edges and at the seam where the ends over-lapped, thereby forming a completely sealed envelope.

Approximately 10 pounds of white goods was placed into a Kenmore automatic washing machine and the wash cycle was set to high water level, 12 minutes' duration and hot temperature. After the correct water level was reached and the water shut off, a synthetic detergent (Tide) was introduced and at the same time the Dacron envelope containing "Ad-Dri" bleach was also introduced. The washing and rinsing then was carried out according to a normal cycle. The following observations were noted:

(1) The introduction of the Dacron envelope containing "Ad-Dri" bleach had no visible adverse effects on the cloth.

(2) The envelope tended to remain on the surface at all times. This was true even after the envelope was purposely replaced as far down into the washing machine as possible.

(3) All of the bleach mixture appeared to be dissolved in three to four minutes.

(4) At the end of the 12 minute wash cycle, there was no residue left in the bleach envelope nor was there any physical damage of any kind to the envelope.

(5) An available chlorine determination by colorimetric methods showed a slight available chlorine content at the end of the wash cycle but none at the end of the first rinse cycle.

*Example VIII*

Approximately 10 pounds of white goods was placed into a Kenmore automatic washing machine and the wash cycle set to high water level, 12 minutes' duration and hot temperature.

After the correct water level had been reached and the water shut off, an envelope of Dacron, heat-sealed into two parts and containing one ounce "Ad-Dri" bleach in one part and approximately 2 ounces of a synthetic detergent in the second part was added to the machine. During the washing and rinsing, the following observations were noted:

(1) No visible adverse effects on the clothes.

(2) The double packet tended to migrate to the top.

(3) No residue left in either envelope at the end of 4 minutes.

(4) At the end of the 12 minute wash cycle, neither envelope showed any physical damage nor did either contain any holes.

(5) An available chlorine determination by colorimetric methods showed a slight available chlorine content at the end of the wash cycle but none at the end of the first rinse cycle.

*Example IX*

A non-woven, laid fabric of acrylic fibers bonded with acrylic binder, having a weight of 3.66 ounces per square yard and 30 mils in thickness was pressed between heated surfaces until the thickness was reduced to 20 mils. The porosity was between 0.1 and 10. The pressed fabric was folded into an envelope having inside dimensions of 5 x 7 inches after sealing all but one of the margins by placing a strip of 10 mil polyethylene between the layers and pressing between heated surfaces to form a permanent bond. One-half pound of a granular mixture of 63.6 percent of high test calcium hypochlorite containing 71 percent of available chlorine and 36.4 percent of tetrasodium pyrophosphate was placed in the envelope and the remaining edge was sealed as the others. The envelope was suspended in 150 pounds of tap water at 25° C. in a 20 gallon stoneware crock. The water was stirred, sampled and replaced at intervals. Initially 2.7 grams per hour of available chlorine was thus introduced into the water. Light transmission of the water after one hour was 98.2 percent and after two hours 96.2 percent of the original which is well within acceptable limits. The envelope showed no signs of failure or loss of strength.

*Example X*

An all nylon laid fabric having a thickness of 8 mils, weighing 2.58 ounces per yard and having a porosity between 0.1 and 10 was formed into a sealed envelope as described in Example IX and filled with the same hypochlorite-pyrophosphate composition. It was suspended in water and sampled as described in Example IX. The following data were obtained:

| Time, hours | Available chlorine, parts per million | Light Transmission, percent | Available chlorine dissolved per hour, grams |
|---|---|---|---|
| 0 | 0 | 100 | 0 |
| 1 | 85 | 99.2 | 5.8 |
| 2 | 154 | 98.5 | 4.9 |
| 5 | 306 | 92.0 | 4.1 |

*Example XI*

A glass fabric envelope was filled with 100 grams of tablets of a mixture of 250 grams of finely powdered high test calcium hypochlorite, 250 grams of 100 mesh light soda ash and 4 grams of sodium monoxide. The envelope was sealed and suspended in 19 gallons of tap water, stirred intermittently. After six hours, 36 percent of the available chlorine content introduced was dissolved in the water.

What is claimed is:

1. An article of manufacture consisting of a sealed envelope of laid hypochlorite-resistant fibers selected from the group consisting of nylon, polyethylene, polypropylene, polyethylene terephthalate, acrylonitrile, acrylonitrile copolymers, polyvinyl chloride-acetate, polymethyl methacrylate, polyvinylidene chloride, asbestos, glass and mixtures thereof in which 40 to 100 percent of said fibers are thermoplastic, said laid fibers having a porosity from 0.1 to 10, said sealed envelope containing a mixture having 8 to 70 percent available chlorine and consisting essentially of calcium hypochlorite and an alkali metal salt selected from the group consisting of sodium carbonate, sodium silicate, potassium silicate, trisodium phosphate, disodium phosphate, sodium borate, sodium sulfate, sodium chloride, potassium chloride, potassium nitrate, sodium nitrate, tetrasodium pyrophosphate, sodium tripolyphosphate, sodium tetraphosphate and sodium hexametaphosphate.

2. An article of manufacture consisting of a sealed envelope of laid hypochlorite-resistant fibers having a porosity between about 0.01 and 25, from 40 to 100 percent of said fibers being thermoplastic and containing within said envelope a solid calcium hypochlorite composition containing 8 to about 70 percent available chlorine, said composition consisting essentially of calcium hypochlorite and water-soluble alkali metal salts selected from the group consisting of diluent salts inert to calcium hypochlorite and salts reactive with calcium hypochlorite to form a water-soluble hypochlorite and a precipitate of a water-insoluble calcium salt.

References Cited by the Examiner

UNITED STATES PATENTS 2,414,833  1/47  Osborne _____ 99—77.1 XR
2,470,851  5/49  Hermanson _____ 252—93 XR (Other references on following page)

UNITED STATES PATENTS

| | | | |
|---|---|---|---|
| 2,475,241 | 7/49 | Hermanson | 99—77.1 |
| 2,829,110 | 4/58 | Robson | 252—96 XR |
| 2,959,554 | 11/60 | Robson | 252—187 XR |
| 2,963,440 | 12/60 | Robson | 252—99 XR |
| 3,009,627 | 11/61 | Ottinger | 229—53 |
| 3,081,515 | 3/63 | Grinswold et al. | 28—78 |

OTHER REFERENCES

"Comparative Chemical Resistance of Fibers," Du Pont Bulletin X-48, March 1956 (Chart 5). "Technology of Synthetic Fibers," MacFarlene (1953), TS 1548.5 M2 C.2 (page 389).

JULIUS GREENWALD, *Primary Examiner.*

UNITED STATES PATENT OFFICE
CERTIFICATE OF CORRECTION

Patent No. 3,154,495                     October 27, 1964

Homer L. Robson et al.

It is hereby certified that error appears in the above numbered patent requiring correction and that the said Letters Patent should read as corrected below.

Column 3, line 13, after "is" insert -- immersed in the aqueous medium to be treated, advanta- --.

Signed and sealed this 23rd day of March 1965.

(SEAL)
Attest:

ERNEST W. SWIDER
Attesting Officer

EDWARD J. BRENNER
Commissioner of Patents